United States Patent

[11] 3,630,123

| [72] | Inventors | Edward E. Ames<br>Hilton;<br>Charles L. Cooke; Kenneth N. Ross, both of Rochester, all of N.Y. |
|---|---|---|
| [21] | Appl. No. | 841,275 |
| [22] | Filed | July 14, 1969 |
| [45] | Patented | Dec. 28, 1971 |
| [73] | Assignee | Eastman Kodak Company<br>Rochester, N.Y. |

[54] CONTAINER INSERT APPARATUS
14 Claims, 2 Drawing Figs.

[52] U.S. Cl. .................................................. 93/37 R,
93/36 MM, 93/36 SQ, 93/53 AC
[51] Int. Cl. ....................................................... B31b 11/74,
B31b 1/62, B31b 1/06
[50] Field of Search .......................................... 93/36 MM,
36 SQ, 37–38, 53; 53/60, 67

[56] References Cited
UNITED STATES PATENTS

| 2,935,827 | 5/1960 | Burt ............................. | 53/60 |
| 3,133,481 | 5/1964 | McCormick ................. | 93/37 |
| 3,134,308 | 5/1964 | Ali-Oglu ....................... | 93/37 |
| 3,216,173 | 11/1965 | Anderson ..................... | 53/60 |
| 3,350,836 | 11/1967 | Dillon ........................... | 53/67 |
| 3,435,738 | 4/1969 | Berney ......................... | 93/53 |
| 3,465,497 | 9/1969 | Tatibana ...................... | 93/37 |
| 3,483,802 | 12/1969 | Heyne .......................... | 93/38 |

*Primary Examiner*—Wayne A. Morse, Jr.
*Attorneys*—W. O. Hodsdon and R. L. Randall ABSTRACT: Apparatus for supplying, controlling, and inserting container inserts which are lightweight and relatively unstable when stacked. Polystyrene inserts are supplied in multiple stacks and are aligned and supported to prevent misalignment during feeding to the containers. A movable wall supports and aligns the stack of inserts as it is moved to a feeding hopper. Individual inserts are removed from the bottom of the stack in the feeding hopper and are passed over an adhesive applicator. The individual insert is then pressed into a waiting container.

EDWARD E. AMES
CHARLES L. COOKE
KENNETH N. ROSS
INVENTORS

ATTORNEYS

CONTAINER INSERT APPARATUS

BACKGROUND OF THE INVENTION

The present application is directed to a method and apparatus for supplying and inserting a container packing insert, and more particularly for supplying and inserting lightweight, rigid plastic foam packaging inserts.

Many articles are now packaged in containers which are provided with rigid plastic foam inserts, many of which are custom formed to hold the article being packaged. Such inserts both position and protect the articles from damage during handling. In forming the packages containing such inserts, the box member and the insert are separately formed and one of the members is provided with an adhesive-coated surface. The insert is then inserted in the preformed box. While such rigid plastic foam inserts are advantageous in that they positively locate the articles being packaged, providing protecting against damage thereto and, at the same time, adding relatively little weight to the final package, the handling and insertion of the insert into the container has proved to be time consuming and expensive. This is due to the fact that the rigid plastic foam inserts usually have such a low weight to volume ratio, and are custom formed to the article being packaged, rather than having regular surfaces for ease of stacking, that they are relatively difficult to mechanically handle. This is due to the fact that, since the inserts are very lightweight, slight jarring and, at times, even drafts of air are sufficient to misalign and topple a stack of such inserts. As a result it has been common practice to supply such inserts in a tote box to a production station where an operator manually removes individual inserts, applies an adhesive to one surface thereof, and inserts it into a preformed box. This manual handling of such inserts is both time consuming and expensive. Accordingly, automatic apparatus to handle and insert such inserts would substantially reduce the cost of forming such article-protecting containers.

SUMMARY OF THE INVENTION

Accordingly, the present invention provides apparatus for supplying and introducing lightweight packing inserts into boxes comprising a conveyor for supplying a plurality of stacks of inserts to a box-loading station. Means is provided which gives stabilizing support to at least two sides of each of the insert stacks on the conveyor means. Means is also provided for moving the stacks one at a time from the conveyor means into a box-loading station while maintaining stabilizing support on at least two sides of the stack being moved into the box-loading station. And means is provided for removing a single insert from the stack in the box-loading station and inserting it into a box at the box-loading station.

The present invention also provides apparatus which provides total support to the stack of inserts being introduced into the boxes while isolating any vibration incurred in the introduction operation from the remainder of the stacks on the apparatus to prevent disturbing and misaligning them.

More particularly, the present invention provides apparatus for supplying and introducing lightweight plastic foam packing inserts into boxes. The apparatus includes a first endless conveyor belt having a width substantially equal to the width of an integral number of inserts with a drive means arranged to intermittently drive the conveyor belt selectively in both directions. Stationary vertical wall means are arranged coextensive with each side of the conveyor belt. A table means is disposed contiguous with one end of the conveyor belt and has a stationary vertical wall disposed along the side thereof opposite the end of the conveyor belt. The table means extends across the width of the conveyor belt and beyond one edge thereof a distance at least as great as the width of one insert. A first movable vertical wall is normally disposed at the end of the table means opposite the portion thereof extending beyond the width of the conveyor belt. The extending portion of the table is provided with a stationary vertical wall opposite the movable wall of the table means and a second movable vertical wall at right angles to the stationary wall on the conveyor side of the extending portion of the table. Means is provided for moving the first movable vertical wall intermittently across the table means towards the portion thereof extending beyond the conveyor. A vertical hopper is disposed adjacent the extending portion of the table means and is arranged to accept a vertical stack of inserts. The hopper has vertically extending stationary walls on three sides thereof and an open side adjacent the table means. Means for moving the second movable wall is provided to move a stack of inserts from the extending portion of the table means into the hopper. An adhesive applicator is disposed subjacent one edge of the hopper. A second conveyor means for transporting a plurality of boxes each having an open upper side is provided subjacent and to one side of the adhesive applicator with means for selectively stopping a box adjacent the adhesive applicator. Means is also provided for stopping the following boxes before reaching the applicator. One of the stationary vertically extending walls of the hopper adjacent the applicator and the second conveyor means has an opening therethrough at the lower end thereof with means arranged for removing the lowermost insert from the hopper through the opening and passing the insert over the applicator to above the waiting box on the conveyor. And means is provided for introducing the insert into said box.

Moreover, the present invention provides a first sensing means arranged to sense the absence of inserts above a first level in the hopper and to retract the second movable wall from the hopper and thereafter to advance the first movable wall to supply a stack of inserts to the extending portion of the table means. A second sensing means is arranged to sense the absence of inserts above a second level lower than the first level in the hopper means to actuate the second wall means to transfer the stack of inserts on the extending portion of the table into the hopper.

Also, the present invention includes means arranged to sense the location of the first movable wall means immediately adjacent the extending portion of the table means and to retract the first movable wall means to its normal position. Thereafter, the first endless conveyor belt is actuated to first advance a row of stacks of inserts onto the table means and against the stationary vertical wall disposed along the side thereof opposite the end of the conveyor and then to reverse the first endless conveyor belt to remove the stacks of inserts thereon from the stacks of inserts on the table means a distance less than the length of an insert.

In addition, the present invention provides apparatus including a pair of insert guide and support members extending along both sides of the applicator over the second conveyor means which are arranged to frictionally grip only the side faces of an insert. The means for inserting an insert into a box includes a vertically movable platen member having an area substantially equal to the area of the insert. A drive means is arranged to drive the platen downwards to drive the insert downward from the insert guide and support members into a waiting box and to seat the insert in the box.

The various features of novelty which characterize the present invention are pointed out with particularity in the claims annexed to and forming a part of this specification. For a better understanding of the invention, its operating advantages and the specific objects obtained by its use, reference should be had to the accompanying drawing and descriptive matter in which a preferred embodiment of the present invention is illustrated and described.

DESCRIPTION OF A PREFERRED EMBODIMENT

Figure 1:
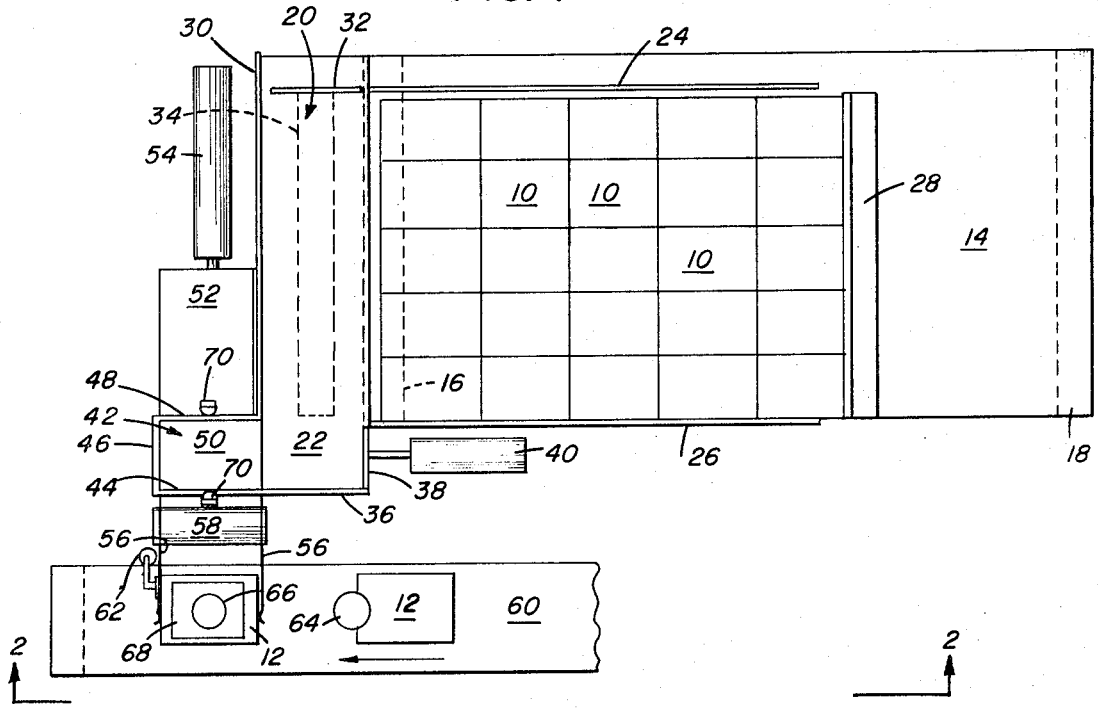
FIG. 1 is a partially schematic plan view of a preferred embodiment of the container insert apparatus of the present invention.
Figure 2:
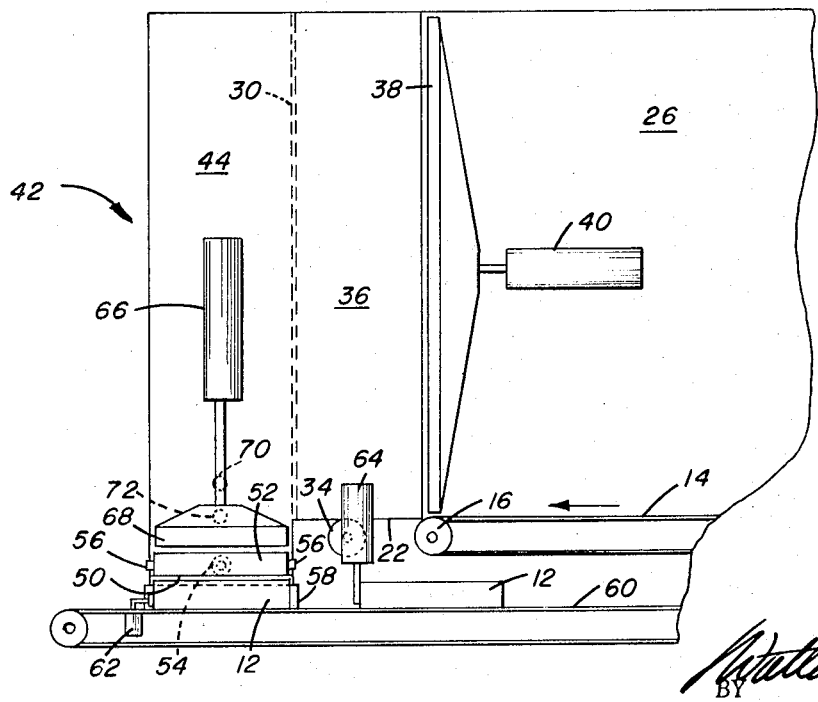
FIG. 2 is a side elevation view taken along line 2—2 of FIG. 1.

A plan view of a preferred embodiment of the present invention is illustrated in FIGS. 1 and 2 and comprises apparatus for supplying and inserting lightweight plastic foam packing inserts 10 into open-top box sections 12. The apparatus comprises a first, endless, horizontally disposed conveyor belt 14 having a width substantially equal to the width of an integral number of inserts 10. The belt 14 is supported and driven by a pair of rollers 16 and 18, in a manner well known in the art. A drive means (not shown) is coupled to one of the rollers and is arranged to intermittently drive the conveyor selectively in both directions, as will be more thoroughly described hereinafter.

A table 20 is disposed at the end of, and in the same horizontal plane as the upper surface of the conveyor belt 14. One edge of the table is contiguous with the end of the belt so that the packing inserts are slid onto the table surface as the belt is advanced. The table has a width substantially equal to the length of one insert and extends from one edge of the belt, across the width of the belt, and has an extension 22 which extends beyond the other edge of the conveyor belt a distance at least as great as the width of one insert.

The conveyor belt 14 is provided with vertically extending walls 24 and 26 coextensive with the opposite sides thereof to provide lateral support to the plurality of vertical stacks of inserts 10 carried thereby. These walls assure that the stacks of inserts on the conveyor are not toppled sideways as the conveyor is driven. A weighted self-supporting movable wall member 28 may be positioned on the conveyor belt 14 at the back of the stacks of inserts to provide stabilizing support to the inserts along that side.

A stationary vertical wall 30 is disposed along the side of table 20 opposite the end of the conveyor 14 and has a length substantially equal to the width of the conveyor, terminating at the conveyor side of the table extension 22. A first movable vertical wall 32 is provided for the table 20 and has a width substantially equal to the width thereof. The movable wall 32 is normally disposed at the end of the table opposite the table extension 22, in alignment with wall 24 of the conveyor. Movable wall 32 is arranged to move intermittently across the table, driven, for example, by a pneumatic or hydraulic actuator 34, between the normal position in alignment with wall 24 of the conveyor and a position substantially in alignment with the wall 26 of the conveyor. A stationary vertical wall 36, which is substantially parallel to and opposite the movable wall 32, is provided for the end of the table extension 22. A second movable vertical wall 38 is disposed at right angles to both wall 36 and conveyor wall 26, along the edge of the table extension which is opposite to wall 30. Wall 38 is movable across the width of the table extension 22, such as by a hydraulic or pneumatic actuator 40.

A box-loading station is disposed adjacent the table extension 22 and comprises a vertical insert hopper 42, which is provided on three sides with wall means 44, 46, and 48. The hopper accepts a single stack of inserts which are moved from the table extension by wall 38 which then forms the fourth side of the hopper, providing complete support and stabilization to the inserts in the hopper. The bottom 50 of the hopper 42 is disposed below the level of table 20 and conveyor 14 a distance equal to the thickness of several inserts 10 to form a reserve of inserts while a new stack is being supplied thereto. The front and rear walls of the hopper, 44 and 48 respectively, are provided with openings (not shown) at the lower ends thereof, which openings have a vertical cross section substantially identical to the projected area of a single insert supported on the bottom of the hopper.

An insert removal mechanism is arranged to remove individual inserts from the bottom of the stack in the hopper and comprises a movable platen 52 connected to an actuator 54, which may be mechanical, hydraulic, or pneumatic. The platen 52 has a vertical cross section substantially equal to the projected area of the insert and is arranged for movement through the openings in the front and rear walls of the hopper. As the platen is moved forward from the opening in the rear wall 48, it pushes an insert out of the bottom of the hopper through the opening in the front wall 44. The width of the platen is slightly less than the length of the insert and the length of the platen is substantially twice the width of the insert. In this manner, force is applied to the entire width of the insert, reducing the possibility of damage thereto, and the overlying inserts in the hopper are provided with support as the platen moves the insert to the loading position.

A pair of spring-loaded support arms 56 extend outwardly from the front wall of the hopper on either side of the opening at the bottom thereof. The arms are arranged to lightly grip the ends of the insert and guide the insert over an adhesive applicator 58 and a second conveyor 60 as the insert is removed from the hopper by platen 52. In its simplest form, the adhesive applicator 58 comprises a roller member disposed adjacent the front opening and having an upper surface substantially in the plane of the bottom 50 of the hopper. The roller member is arranged to rotate in a bath of adhesive, a thin film of which is transferred to the lower surface of the insert as it is removed from the hopper.

The second conveyor 60 is arranged to move open-top box sections 12 in a path parallel to conveyor 14 beneath support arms 56 and adjacent the adhesive applicator 58. This conveyor may be an integral part of the inserting apparatus, or may be a part of a conveyor system for transporting the open-top box sections. A first box section stop 62 is arranged to halt a box section 12 directly below the support arms 56 in response to a signal indicating the presence of a box section on the conveyor. The signal may be generated by a box section sensor (not shown) before the box section reaches the box-loading station. In this way, the insert-supplying apparatus will successfully operate with a source providing an intermittent supply of boxes. A second box section stop 64 is disposed upstream of stop 62 to halt the following box sections while an insert is being introduced into the box section in the loading station.

An insert press is disposed above the support arms 56 in alignment with the position of box section 12 as held by stop 62. The insert press comprises a vertically oriented actuator 66 having a horizontal platen 68 connected to the lower end thereof. The platen has an area just smaller than the insert and is arranged, on operation of the actuator 66, to engage the top surface of the insert 10 and to drive it downwardly from the grip of support arms 56 into the waiting box section 12.

In operation, a plurality of stacks of inserts 10 are loaded in a regular order upon the top of conveyor 14 between stationary walls 24 and 26. The weighted, self-supporting movable wall member 28 is disposed along the rear edge of the inserts to provide support along that surface. The conveyor is then moved forwardly, to the left in the drawings, moving the first row of insert stacks onto the table 20. The conveyor 14 is automatically driven to gently force the foremost surface of the leading row of insert stacks against stationary wall 30 at the side of the table opposite the end of the conveyor. The conveyor is then automatically stopped and reversed, retracting the next adjacent row of insert stacks from the stacks on the table 20 a preselected distance, i.e., 1 inch, to permit movement of the inserts across the table 20 without disturbing the insert stacks remaining on the table. After the conveyor 14 has reversed and stopped, actuator 34 is activated, driving the movable wall 30 towards the table extension 22 until the leading surface of the first insert stack abuts stationary wall 36. At this time, actuator 34 is inactivated and actuator 40 is activated driving movable wall 38 and the single stack of inserts thereagainst into the insert hopper 42. Inasmuch as the bottom 50 of the hopper is disposed below the level of the table 20, the insert stack will drop; however, since the stack is supported and aligned on all four sides by walls 44, 46, 48, and movable wall 38 which remains in a supporting position adjacent the insert hopper, the inserts are not toppled or misaligned when they drop the short distance to the bottom 50 of the hopper. As an open-top box section 12 is delivered by conveyor 60, its approach is detected and stop 62 is actuated, stopping the leading box section directly beneath and in alignment with the support arms 56. At the same time, stop 64 is activated, restraining the following box sections from proceeding to separate the boxes to assure that individual box sections may be detected to initiate the insert introduction cycle. Thereafter, actuator 54 is activated driving platen 52 towards the conveyor 60. As the leading edge of platen 52 enters the lower portion of the insert hopper 42, it drives the lowermost insert ahead of it, across the adhesive applicator 58 and, supported between support arms 56, out over the waiting box section 12. Inasmuch as the platen 52 is provided with a length substantially twice the width of an insert, the inserts remaining in the insert hopper are supported thereby during the insertion operation. After the insert is positioned over the waiting box section 12, actuator 66 is operated, driving platen 68 and the waiting insert downwardly into the waiting box section and actuator 54 is reversed, returning platen 52 to the start position. The actuator is preferably arranged to firmly set the insert in the box section and then to retract the platen 68 to the start position, at which stop 62 is withdrawn, releasing the box and the newly applied insert for continued transfer by the conveyor 60.

The introduction of individual inserts into the open-top box sections is continued until the level of the insert stack in hopper 42 drops to a predetermined level as sensed by detector 70, near the elevation of table 20, at which time movable wall 38 is retracted to its starting position by actuator 40. At this elevation the insert stack in the hopper is sufficiently low that the stabilization of wall 38 is no longer necessary. As soon as wall 38 returns to its starting position, actuator 34 is activated, moving wall 32 towards wall 36 and pushing a new insert stack onto the table extension 22. Thereafter, when the level of inserts in the hopper 42 drops below the level of table 20 as sensed by detector 72, the movable wall 38 is driven towards the hopper by actuator 40, introducing a new insert stack into the hopper for continued supply to the loading station.

The control arrangement of the present invention also provides that when movable wall 32 comes into alignment with stationary wall 26 of the conveyor, having pushed the last remaining insert stack onto the table extension 22, actuator 34 is reversed, returning wall 32 to its initial position in alignment with wall 24. Conveyor 14 is then activated driving a new row of insert stacks onto the table 20.

The present invention thus provides apparatus for automatically and repetitively supplying and inserting lightweight, unstable inserts into containers with the substantial elimination of manual labor or supervision. At the same time, the present arrangement provides substantially complete support and alignment for the stack of inserts in the insert hopper where they are subject to the most vibration and other disturbances in the apparatus. Throughout the remainder of the present apparatus the inserts are provided with support and alignment on at least two sides at all times, thus minimizing the possibility for the stacks to become misaligned or for the inserts to topple from the stacks.

While the foregoing description has been directed to apparatus arranged to supply inserts to a conveyor 60 running in a direction parallel to conveyor 14, it will be appreciated that the insert hopper 42 can be arranged to feed a conveyor running transversely to conveyor 14. In such an arrangement the insert removal mechanism would be arranged with the platen 52 and actuator 54 beneath the table extension 22, driving the inserts towards the wall 46 of the insert hopper. Furthermore, should the present arrangement be utilized for supplying and inserting inserts having some degree of stability, the separate insert hopper 42 can be eliminated with the insert being fed directly from the table extension 22 to the waiting box sections. However, in an arrangement such as this, complete support of the inserts in the area of the strongest vibrational forces would not be possible. Moreover, the isolation of the remainder of the insert stacks in the apparatus from vibrations would not be as complete as that in the preferred embodiment. Nevertheless, were inserts having a more stable configuration to be handled by such an apparatus, the resultant simplification and economy could override the foregoing disadvantages.

The invention has been described in detail with particular reference to preferred embodiments thereof, but it will be understood that variations and modifications can be effected within the spirit and scope of the invention as described hereinabove and as defined in the appended claims.

We claim:

1. Apparatus for supplying and introducing inserts into boxes comprising first conveyor means having a width at least as great as a plurality of inserts, means for intermittently driving said conveyor selectively in both directions, table means disposed contiguous with one end of said conveyor and having a vertical wall disposed along one side thereof opposite said conveyor, said table means extending across the width of the conveyor and beyond one edge thereof a distance at least as great as the width of one insert, movable wall means normally disposed at one end of said table means opposite the portion thereof extending beyond the width of the conveyor means, a hopper arranged to accept a vertical stack of inserts, said hopper being disposed adjacent the extending portion of said table means, means for transferring a stack of inserts from the extending portion of said table into said hopper, an adhesive applicator disposed subjacent one edge of said hopper, second conveyor means for transporting a plurality of boxes subjacent and to one side of said adhesive applicator, means for selectively stopping a box adjacent said adhesive applicator, means for removing an insert from said hopper and passing said insert over said applicator to above the waiting box on said conveyor, and press means for introducing said insert into said box.

2. The invention according to claim 1 including a first sensing means arranged to sense the absence of inserts above a first level in said hopper and to retract said transfer means from said hopper and to advance said movable wall means to supply a stack of inserts to the extending portion of said table means, and a second sensing means arranged to sense the absence of inserts above a second level in said hopper means to actuate said transfer means to transfer said stack of inserts on the extending portion of said table into said hopper.

3. The invention according to claim 1 including means arranged to sense the location of said movable wall means immediately adjacent the extending portion of said table means and to retract said movable wall means to its normal portion and actuate said first conveyor means to first advance a row of stacks of inserts onto said table means and against said vertical wall disposed along the side thereof opposite the end of said conveyor and then to reverse the first conveyor means to remove the stacks of inserts thereon from the stacks of inserts on said table means a distance less than the length of an insert.

4. The invention according to claim 1 including means responsive to a box on said second conveyor means to stop a box subjacent one side of said applicator and to actuate said means for removing an insert from said hopper and passing said insert over said applicator.

5. The invention according to claim 1 including a pair of insert guide and support members extending along both sides of said applicator over said second conveyor means.

6. The invention according to claim 5 wherein said insert guide and support members are arranged to frictionally grip only the side faces of an insert.

7. The invention according to claim 6 wherein said means for introducing an insert into a box includes a vertically movable platen member having an area substantially equal to the area of said insert, and a drive means arranged to drive said platen downwards to drive said insert downward from said insert guide and support members into a waiting box and to seat said insert in said box.

8. Apparatus for supplying and introducing lightweight plastic foam packing inserts into boxes comprising a first endless conveyor belt having a width substantially equal to the width of an integral number of inserts, means for intermittently driving said conveyor belt selectively in both directions, stationary vertical wall means coextensive with each side of said conveyor belt, table means having a width substantially equal to the length of an insert disposed contiguous with one end of said conveyor belt and having a stationary vertical wall disposed along the side thereof opposite the end of said conveyor belt, said table means extending across the width of the conveyor belt and beyond one edge thereof a distance at least as great as the width of one insert, a first movable vertical wall normally disposed at the end of said table means opposite the portion thereof extending beyond the conveyor belt, the extending portion of said table being provided with a stationary vertical wall opposite said movable wall of said table means and a second movable vertical wall at right angles to said stationary wall on the conveyor side of said extending portion of said table, means for moving said first movable vertical wall intermittently across the table means towards the portion thereof extending beyond the conveyor belt, a vertical hopper arranged to accept a vertical stack of inserts, said hopper being disposed adjacent the extending portion of said table means and having vertically extending stationary walls on three sides thereof and an open side adjacent said table means, means for moving said second movable wall to move a stack of inserts from the extending portion of said table means into said hopper, an adhesive applicator disposed subjacent one edge of said hopper, second conveyor means for transporting a plurality of boxes, each having an open, upper side subjacent and to one side of said adhesive applicator, means for selectively stopping a box adjacent said adhesive applicator, means for stopping the following boxes before reaching said applicator, one of said stationary vertically extending walls of said hopper adjacent said applicator and said second conveyor means having an opening therethrough at the lower end thereof, means for removing the lowermost insert from said hopper through said opening and passing said insert over said applicator to above the waiting box on said conveyor, and means for introducing said insert into said box.

9. The invention according to claim 8 including a first sensing means arranged to sense the absence of inserts above a first level in said hopper and to retract said second movable wall from said hopper and to advance said first movable wall to supply a stack of inserts to the extending portion of said table means, and a second sensing means arranged to sense the absence of inserts above a second level lower than said first level in said hopper means to actuate said second wall means to transfer said stack of inserts on the extending portion of said table means into said hopper.

10. The invention according to claim 8 including means arranged to sense the location of said first movable wall means immediately adjacent the extending portion of said table means and to retract said first movable wall means to its normal position and then actuate said first endless conveyor belt to first advance a row of stacks of inserts onto said table means and against said stationary vertical wall disposed along the side thereof opposite the end of said conveyor and then to reverse the first endless conveyor belt to remove the stacks of inserts thereon from the stacks of inserts on said table means a distance less than the length of an insert.

11. The invention according to claim 8 including means responsive to a box on said second conveyor to stop a box subjacent one side of said applicator and to actuate said means for removing the lowermost insert from said hopper and passing said insert over said applicator.

12. The invention according to claim 8 including a pair of insert guide and support members extending along both sides of said applicator over said second conveyor means.

13. The invention according to claim 12 wherein said insert guide and support members are arranged to frictionally grip only the side faces of an insert.

14. The invention according to claim 13 wherein said means for inserting an insert into a box includes a vertically movable platen member having an area substantially equal to the area of said insert, and drive means arranged to drive said platen downwards to drive said insert downward from said insert guide and support members into a waiting box and to seat said insert in said box.

* * * * *